(12) United States Patent
Talayco et al.

(10) Patent No.: US 8,203,964 B2
(45) Date of Patent: Jun. 19, 2012

(54) ASYNCHRONOUS EVENT NOTIFICATION

(75) Inventors: Daniel Talayco, Mountain View, CA (US); Brian Baird, Pleasanton, CA (US)

(73) Assignee: Broadcom Corporation, Irvine, CA (US)

( * ) Notice: Subject to any disclaimer, the term of this patent is extended or adjusted under 35 U.S.C. 154(b) by 638 days.

(21) Appl. No.: 11/429,287

(22) Filed: May 8, 2006

(65) Prior Publication Data

US 2006/0271676 A1    Nov. 30, 2006

Related U.S. Application Data

(60) Provisional application No. 60/678,194, filed on May 6, 2005.

(51) Int. Cl.
H04L 12/28 (2006.01)
G06F 15/173 (2006.01)

(52) U.S. Cl. .......................... 370/254; 709/223; 709/226

(58) Field of Classification Search .................. None
See application file for complete search history.

(56) References Cited

U.S. PATENT DOCUMENTS

| | | | | |
|---|---|---|---|---|
| 6,012,084 | A * | 1/2000 | Fielding et al. | 709/205 |
| 7,089,307 | B2 * | 8/2006 | Zintel et al. | 709/224 |
| 7,120,683 | B2 * | 10/2006 | Huang | 709/223 |
| 7,225,243 | B1 * | 5/2007 | Wilson | 709/223 |
| 7,293,080 | B1 * | 11/2007 | Clemm et al. | 709/223 |
| 2003/0088651 | A1 * | 5/2003 | Wilson, Jr. | 709/221 |
| 2003/0097425 | A1 * | 5/2003 | Chen | 709/220 |
| 2003/0126262 | A1 * | 7/2003 | Yoshida et al. | 709/226 |
| 2003/0182431 | A1 * | 9/2003 | Sturniolo et al. | 709/227 |
| 2004/0003111 | A1 * | 1/2004 | Maeda et al. | 709/237 |
| 2004/0098415 | A1 * | 5/2004 | Bone et al. | 707/200 |
| 2004/0254984 | A1 * | 12/2004 | Dinker | 709/205 |
| 2004/0260800 | A1 * | 12/2004 | Gu et al. | 709/223 |
| 2005/0114493 | A1 * | 5/2005 | Mandato et al. | 709/223 |
| 2005/0152305 | A1 * | 7/2005 | Ji et al. | 370/328 |
| 2006/0002311 | A1 * | 1/2006 | Iwanaga et al. | 370/254 |
| 2006/0198346 | A1 * | 9/2006 | Liu et al. | 370/338 |

* cited by examiner

Primary Examiner — Brandon Renner

(57) ABSTRACT

The invention includes a method system and apparatus for an asynchronous event notification. In the event that a system-wide application requires notification of an asynchronous event that occurs in a remote device within the communications system, the event is locally detected and the necessary information is forwarded to the application.

18 Claims, 5 Drawing Sheets

ASYNCHRONOUS EVENT NOTIFICATION

CROSS-REFERENCE TO RELATED APPLICATIONS

This application claims priority of U.S. Provisional Patent Application No. 60/678,194, filed on May 6, 2005. The subject matter of this earlier filed application is hereby incorporated by reference.

BACKGROUND OF THE INVENTION

1. Field of the Invention

The present invention relates to devices, methods and networks that utilize data that is sent or received over data communications or computer networks.

2. Description of the Related Art

As computer performance has increased in recent years, the demands on computer networks has significantly increased; faster computers processors and higher memory capabilities need networks with high bandwidth capabilities to enable high speed transfer of significant amounts of data. The well known Ethernet technology, which is one example of computer networking technology has been able to be modified and improved to remain a viable computing technology.

Based upon the Open System Interconnect (OSI) 7-layer reference model, network capabilities have grown through the development of repeaters, bridges, routers and switches, which operate with various types of communication media. Collectively, with respect to the present invention, all of these may be referred to as network devices. Switches, as they relate to computer networking and to Ethernet, are hardware-based devices which control the flow of datagrams, data packets or cells based upon destination address information which is available in each packet. A properly designed and implemented switch should be capable of receiving a packet and switching the packet to an appropriate output port at the maximum speed capability of the particular network.

Referring to the OSI 7-layer reference model discussed previously, the higher layers typically have more information. Various types of products are available for performing switching-related functions at various levels of the OSI model. Hubs or repeaters operate at layer 1, and essentially copy and "broadcast" incoming data to a plurality of spokes of the hub. Layer 2 switching-related devices are typically referred to as multiport bridges, and are capable of bridging two separate networks. Bridges can create a table of forwarding rules based upon which media access controller (MAC) address exist on which ports of the bridge, and pass packets that are destined for an address which is located on an opposite side of the bridge. Bridges typically utilize what is known as the "spanning tree" algorithm to eliminate potential data loops; a data loop is a situation wherein a packet endlessly loops in a network looking for a particular address. The spanning tree algorithm defines a protocol for preventing data loops. Layer 3 switches, sometimes referred to as routers, can forward packets based upon the destination network address. Layer 3 switches are capable of learning addresses and maintaining tables thereof which correspond to port mappings. Processing speed for layer 3 switches can be improved by utilizing specialized high performance hardware, and off loading the host CPU so that instruction decisions do not delay packet forwarding.

In addition, there has also been pressure from the implementers of the computer networks to have network devices to mediate traffic on the computer networks that are flexible and are able to provide the needed capacity through the combination of multiple network devices. For example, a network device having eight ports may be linked with one or more similar network devices to provide the capacity of the multiple ports of the linked devices. While the combination of multiple network devices may be ideal in meeting capacity requirements, the combination of the network devices also results in other issues. One such issue is that each network device has its own means for determining the destination port for a received datagram and those means must be synchronized to provide efficient operation. While the prior art network devices and methods provide many of these attributes, there is a need for network devices that may be used together to provide the capacity needed by the implementers and provide efficiency in handling of datagrams.

DETAILED DESCRIPTION OF THE PREFERRED EMBODIMENT(S)

Stackable and chassis-based software products reflect two approaches to address the requirements discussed above. Building these systems involves solving many complex issues.

Stacking is a method of connecting two or more physical switch devices to build a larger system that behaves as a single logical entity. For example, for some devices, this means connecting devices together using Gigabit ports configured in a stacked mode. In other examples, stacking is accomplished over various links such as a Gigabit link.

In these examples, the hardware attaches information to each packet traversing a stack link. This allows the switch device functions to work properly across multiple devices. For example, link aggregation requires that information be passed with the packet to provide load balancing across the trunked ports. The goal of stacking is to eliminate the need for applications to be aware of these details.

Figure 1:
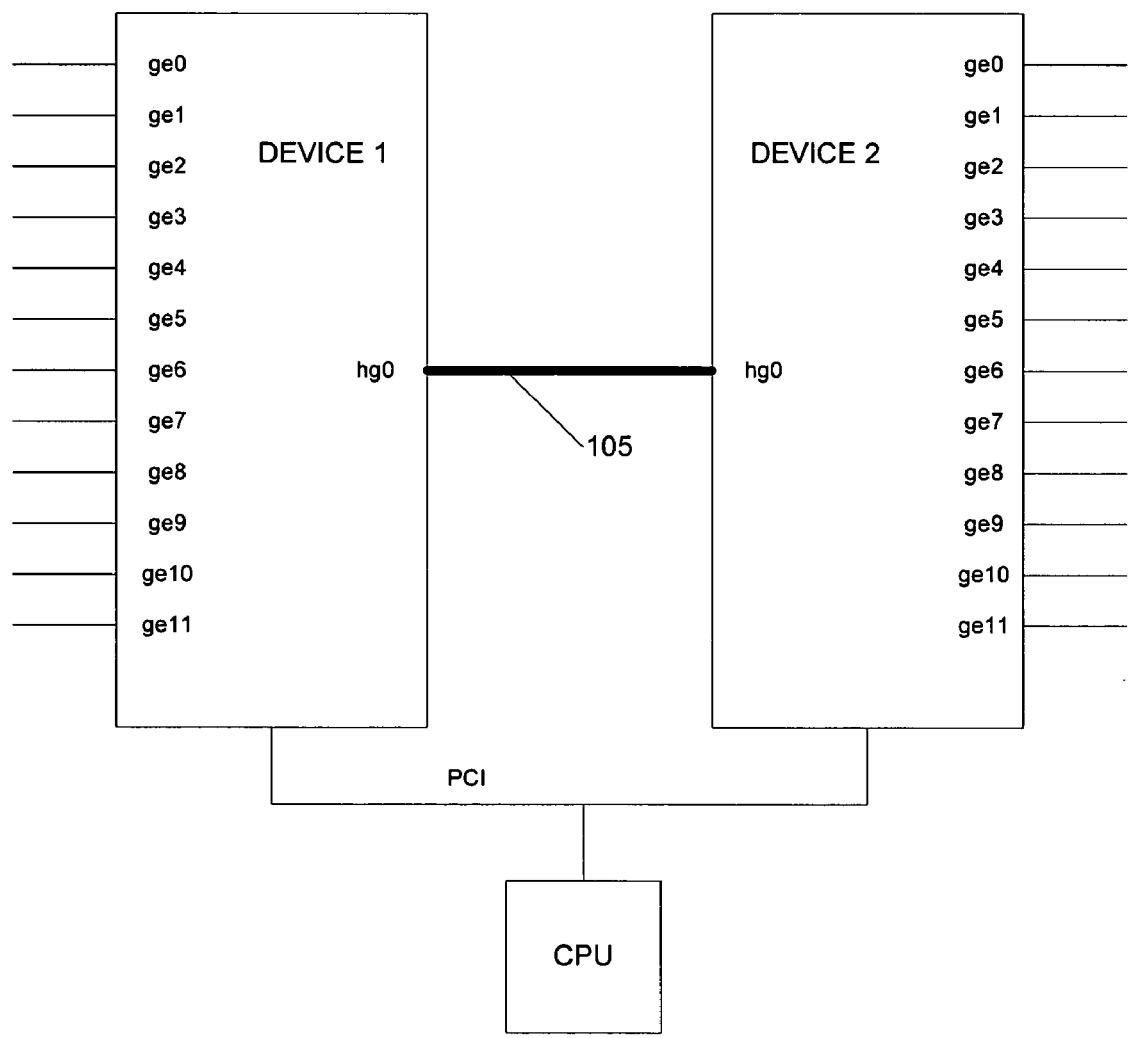
FIG. 1 illustrates an example of a device configuration.

When multiple devices exist in a system, tasks such as creating a virtual local area network (VLAN) may require the programming of all of these devices. FIG. 1 illustrates an example of a device configuration. In this example, the two devices Device 1 and Device 2 are connected back to back by a link 105 such as a PCI bus. In this example, only one CPU is used to manage this configuration. The use of an API to control these devices is relatively straight forward, as the two devices Device 1 and Device 2 are recognized on the PCI bus 105 and programmed directly by the CPU. In such a configuration, there are programming requirements to ensure that the two chips act as one.

For example, to create a VLAN that includes all 24 Gigabit ports, each device must be programmed to create the VLAN, add all 12 GE ports to the VLAN, as well as add the links to the VLAN. An appropriate API is needed in order to enable rapid and accurate development on configurations with multiple devices.

A more complex form of stacking involves multiple CPUs where multiple independent switches that are connected together act as one logical switch. For example, a 48-port switch with its own CPU subsystem and local configuration may be connected to another such unit.

Figure 2:
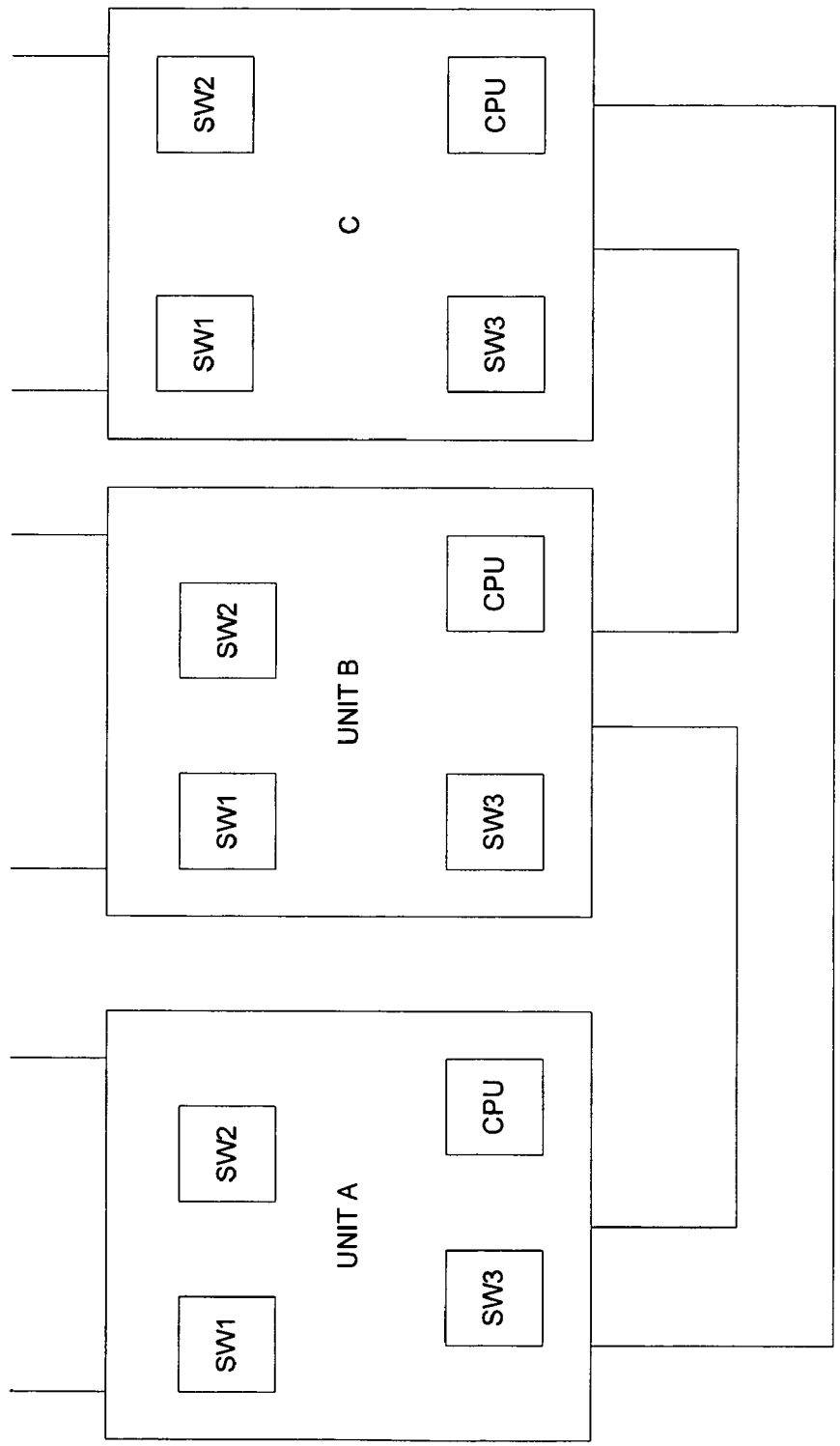
FIG. 2 represents an exemplary configuration of a communications system of stacked network devices.

FIG. 2 represents an exemplary configuration of a communications system of stacked network devices. In FIG. 2, three units Unit A, Unit B and Unit C are stacked, or connected together to provide the scalability discussed above. The network devices send and/or receive data across dedicated connections referred to as "stack ports." Note that each unit may include multiple switch devices 1, 2 and 3. According to this configuration, each device within the system is controlled by a CPU that programs the local circuitry, as well as, coordinates with CPUs in other units. The stacked network devices perform as a single logical network switch with a larger load capacity. Network devices may be network hardware components capable of generating, receiving and processing packets. The network devices may have switching and/or routing capabilities that are utilized in a local area network (LAN) or other communications networks or systems. As shown in the example illustrated in FIG. 2, each of the network devices may include a processor (CPU) or CPU functionality, be in communication with a CPU or connected to an external CPU. The CPU programs the local circuitry, as well as, coordinates with CPUs in other units within the system.

Synchronous application program interfaces (APIs) are used to program a network device to perform a specific function for example create a virtual local area network (vlan), or destroy a vlan. Asynchronous APIs are functions that take place at a later time and do not receive data or a response immediately after sending the message. Asynchronous APIs periodically poll network devices or use interrupts, in order to determine their status. If the status of the device being polled is changed, such as a link to the device being created or destroyed, the device sends a call-back, or an indication of the change of status. This change of status is referred to as an asynchronous event. Synchronous events are those that occur as a direct result of a CPU operation. Asynchronous events are those that may occur at any time relative to the processing being done by the CPU. For example, the CPU may read a register and the device will synchronously respond with the result. But a user of a switch may connect a cable causing an asynchronous link state change event at any time, no matter what processing the CPU is doing at the time. Typically asynchronous events are handled either by CPU polling or by hardware interrupts.

Asynchronous events include, but are not limited to for example, reconfiguration events, link changes, discovery packet arrivals, functions that learn new addresses and destroys old addresses etc.

Further, asynchronous events can be problematic in the event that multiple units are configured as shown in FIG. 2. For example, the configuration shown in FIG. 2 cannot use physical interrupts between units or handle asynchronous events that occur on other units within a stacked system, in other words, remote units or devices.

According to an exemplary embodiment of the invention, notification of an asynchronous event is sent from remote devices in order to prevent the application device from having to constantly poll the remote device in order to determine if an asynchronous event has occurred and in a manner that is transparent to the application. Thus, asynchronous events occurring on remote devices can be transferred to the application as perform the same function as an interrupt.

Figure 3:
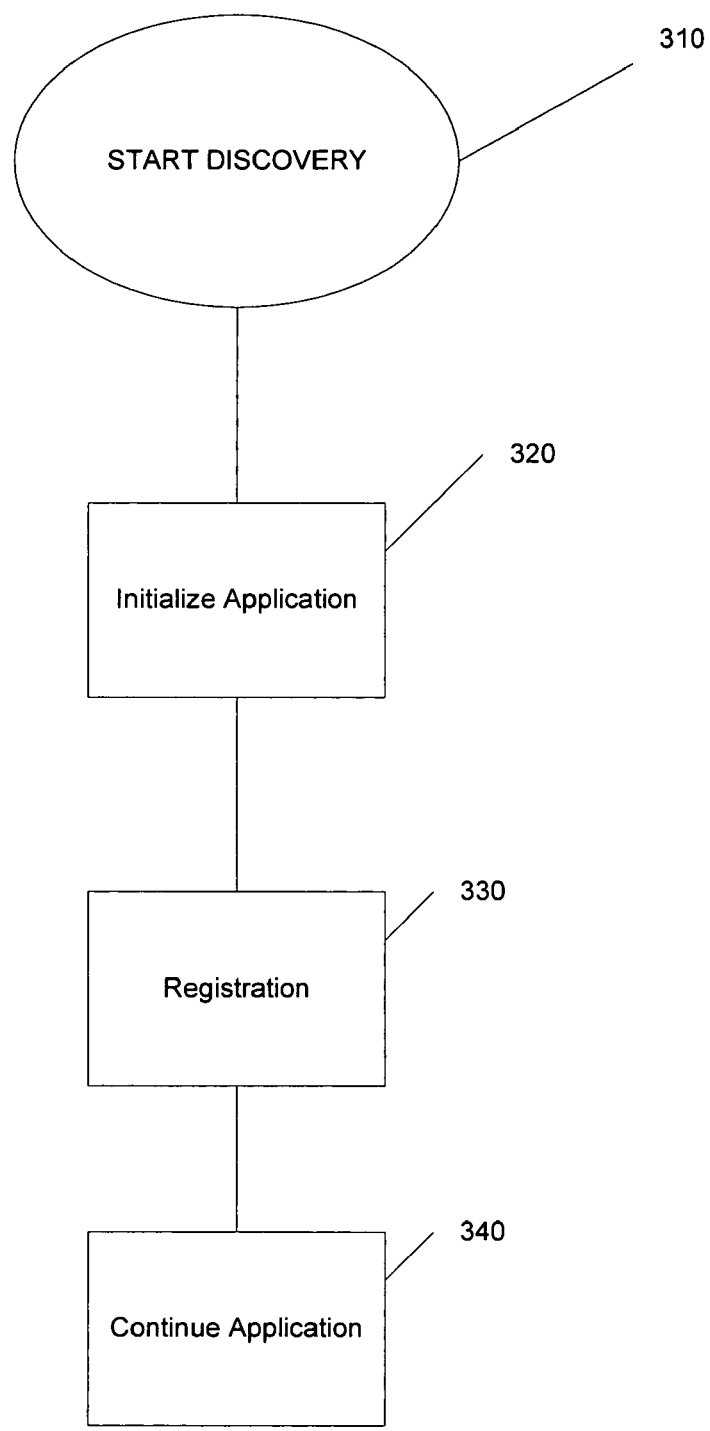
FIG. 3 is flow diagram illustrating an exemplary embodiment of the present invention.

FIG. 3 is a flow diagram that illustrates an exemplary embodiment according to the present invention. As discussed above, a plurality of stacked network units form a system. Thus, the configuration of the system (system topology) has to be discovered at step 310. The topology of the system can be discovered either manually or automatically.

Further, the topology discovery process provides a reference implementation for determining an operational configuration for the system. For example, the process examines connections detected by discovery, determines the shortest path between subsystems and indicates which ports should be enabled for which connections. According to another exemplary embodiment of the invention, topology discovery includes local link registration within each unit. The local information is stored in the CPU of the unit.

At step 320, an application is initialized to be run on the system. At step 330 the registration process is performed in order to allow later notifications to be coveyed to the application of remote asynchronous events that occur within the system. In accordance with the exemplary embodiment of the invention, FIG. 4 illustrates an example of the registration process of step 330.

Figure 4:
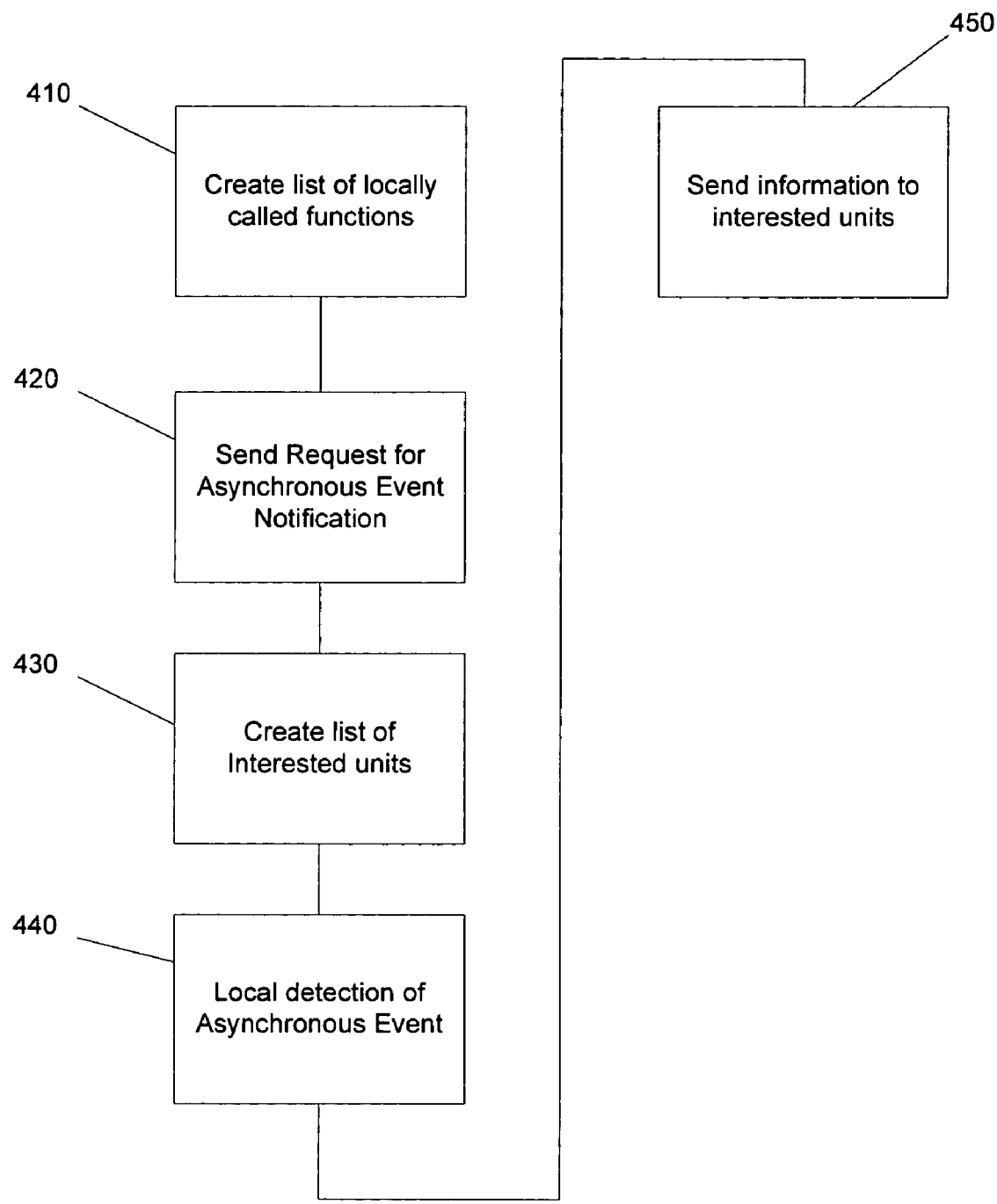
FIG. 4 illustrates an example of device registration process.

FIG. 4 illustrates the registration process for the example configuration shown in FIG. 2.

In this example, Unit A generates a list of functions that have been requested by the local devices that require call-backs 410. The list of functions is stored in the CPU of Unit A.

At 420 a request for event notification message is sent from Unit A to the other units in the system that generally states that the CPU on Unit A is interested in any asynchronous events that occur on the remote devices within the system. In this example, this message is sent to Unit B.

Once the message sent at 420 is received by Unit B, at 430 the CPU on Unit B then creates a second list that is stored on the CPU of Unit B that includes entries regarding the devices that are local to Unit B. These entries indicate which CPUs within the system are interested in asynchronous events that occur regarding the devices on Unit B. In this example, the CPU of Unit A has a sent a request for notification of asynchronous events to Unit B, and therefore is interested in asynchronous events that occur on the remote device located in Unit B. Thus, in this example, the CPU of Unit A is added to the list created in Unit B.

At step 440 an asynchronous event for example, a link change, is detected for the remote device in another unit within the communications system. A function that is local to the devices on Unit B is called to check the second list to determine which units within the system are listed as being interested in the link change of the remote device. In this example, the application will find that the CPU on Unit A is listed as interested in the link change event. The CPU of Unit B at step 450 will collect and send all of the necessary information concerning the remote device to the CPU of Unit A.

After receiving the information that was collected and sent from the remote unit, the CPU of Unit A scans the first list to determine which local functions are interested in the asynchronous event that occurred on the remote device in Unit B. Thus, an application running on Unit A has all of the necessary information that is needed, and is not concerned about where in the system the remote device is located.

Referring again to FIG. 3, at step 340 the application continues regardless of the location of the device on which the asynchronous event occurred.

Figure 5:
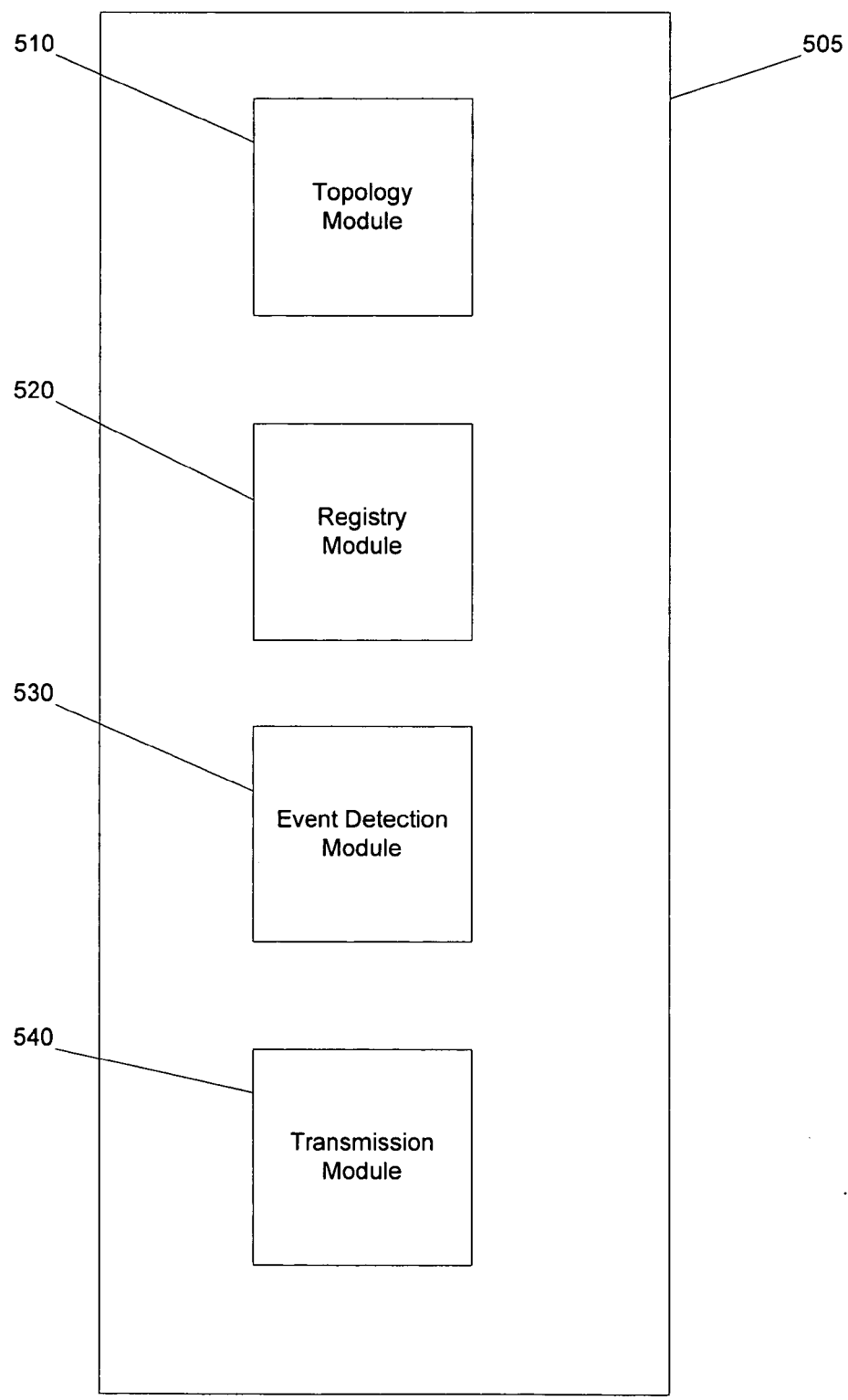
FIG. 5 illustrates an exemplary configuration of a system according to an embodiment of the invention.

FIG. 5 illustrates an exemplary configuration of a system according to an embodiment of the invention. The system 505 includes four modules. A topology module 510 discovers the topology of the system as well as local link registration of the individual units.

A registry module 520 can for example perform in one example the registration process that is described above and the example illustrated in FIG. 4. The Event Notification Module 520 detects local asynchronous events. As discussed above, the local CPU of a remote unit in the system would detect the asynchronous event, scans a list of interested units and gathers information regarding the device. The Transmission Module 540 forwards the gathered information to the interested units.

As discussed above, the stacked configurations are scalable. Therefore, a large amount of units can make up a single system that utilizes the above-described method and system.

One having ordinary skill in the art will readily understand that the invention as discussed above may be practiced with steps in a different order, and/or with hardware elements in configurations which are different than those which are disclosed. For example, the present invention may be implemented at least as a computer product including computer-readable code, a chip set or ASIC, or a processor configured to implement the method or system. Additionally, the invention may be implemented as a protocol to support notification of a remote application of asynchronous events. Therefore, although the invention has been described based upon these preferred embodiments, it would be apparent to those of skill in the art that certain modifications, variations, and alternative constructions would be apparent, while remaining within the spirit and scope of the invention.

The invention claimed is:

1. A method for asynchronous event notification within a communication system, comprising:
   creating a first list at a local processor that controls a local network stack, the first list identifying a first local device in the local network stack and a remote event about which the first local device wants to be notified when the remote event occurs on a remote network stack;
   sending a registration request to a remote processor that controls the remote network stack, the registration request identifying the local processor and the remote event;
   receiving at the local processor a registration request from a second remote processor that controls a second remote network stack, the registration request identifying the second remote processor and a local event about which the second remote processor wants to be notified when the local event occurs on the local network stack; and
   creating a second list at the local processor, the second list identifying the local event and the second remote processor to notify when the local event occurs.

2. The method of claim 1, further comprising:
   receiving a message from the remote processor that the remote event has occurred;
   determining from the first list the identify of the first local device that wants to be notified when the remote event occurs; and
   sending a notification message to the first local device that the remote event has occurred.

3. The method of claim 1, wherein the remote processor and the second remote processor are the same processor, and the remote network stack and the second remote network stack are the same network stack.

4. The method of claim 1, further comprising:
   receiving notification at the local processor that the local event has occurred;
   determining from the second list the identity of the second remote processor to be notified when the local event has occurred; and
   sending the second remote processor a notification that the local event has occurred.

5. The method of claim 4, wherein the notification received at the local processor that the local event has occurred is an interrupt message from a second local device on the local network stack.

6. The method of claim 5, wherein the first local device and the second local device are the same device.

7. A network stack, comprising:
   at least one network device;
   a processor that controls the at least one network device; and
   a memory for storing instructions that when executed by the processor causes the processor to:
      create a first list that identifies the at least one network device and a remote event about which the at least one network device wants to be notified when the remote event occurs on a remote network stack;
      send a registration request to a remote processor that controls the remote network stack, the registration request identifying the processor and the remote event;
      receive a registration request from a second remote processor that controls a second remote network stack, the registration request identifying the second remote processor and a local event about which the second remote processor wants to be notified when the local event occurs on the network stack; and
      create a second list that identifies the local event and the second remote processor to notify when the local event occurs.

8. The network stack of claim 7, wherein the memory further stores instructions that when executed by the processor causes the processor to:
   receive a message from the remote processor that the remote event has occurred;
   determine from the first list the identify of the at least one network device that wants to be notified when the remote event occurs; and
   send a notification message to the at least one network device that the remote event has occurred.

9. The network stack of claim 7, wherein the remote processor and the second remote processor are the same processor, and the remote network stack and the second remote network stack are the same network stack.

10. The network stack of claim 7, wherein the memory further stores instructions that when executed by the processor causes the processor to:
    receive notification that the local event has occurred;
    determine from the second list the identity of the second remote processor to be notified when the local event has occurred; and
    send the second remote processor a notification that the local event has occurred.

11. The network stack of claim 10, wherein the notification received at the processor that the local event has occurred is an interrupt message from a second device on the network stack.

12. The network stack of claim 11, wherein the at least one network device and the second device are the same device.

13. An apparatus, comprising:
    a processor; and
    a memory for storing instructions that when executed by the processor causes the processor to:
       create a first list that identifies at least one network device and a remote event about which the at least one network device wants to be notified when the remote event occurs on a remote network stack;

send a registration request to a remote processor that controls the remote network stack, the registration request identifying the processor and the remote event;

receive a registration request from a second remote processor that controls a second remote network stack, the registration request identifying the second remote processor and a local event about which the second remote processor wants to be notified when the local event occurs on the network stack; and create a second list that identifies the local event and the second remote processor to notify when the local event occurs.

14. The apparatus of claim 13, wherein the memory further stores instructions that when executed by the processor causes the processor to:

receive a message from the remote processor that the remote event has occurred;

determine from the first list the identify of the at least one network device that wants to be notified when the remote event occurs; and send a notification message to the at least one network device that the remote event has occurred.

15. The apparatus of claim 13, wherein the remote processor and the second remote processor are the same processor, and the remote network stack and the second remote network stack are the same network stack.

16. The apparatus of claim 13, wherein the memory further stores instructions that when executed by the processor causes the processor to:

receive notification that the local event has occurred;

determine from the second list the identity of the second remote processor to be notified when the local event has occurred; and send the second remote processor a notification that the local event has occurred.

17. The apparatus of claim 16, wherein the notification received at the processor that the local event has occurred is an interrupt message from a second device on the network stack.

18. The apparatus of claim 17, wherein the at least one network device and the second device are the same device.

* * * * *